United States Patent [19]
Wanat

[11] 3,765,051
[45] Oct. 16, 1973

[54] APPARATUS FOR CLEANING FILTER ELEMENTS OR THE LIKE
[75] Inventor: Charles T. Wanat, Oklahoma City, Okla.
[73] Assignee: A-Nu, Inc., Oklahoma City, Okla.
[22] Filed: Nov. 12, 1971
[21] Appl. No.: 198,196

[52] U.S. Cl.................... 15/302, 15/304, 15/310, 134/86, 134/89, 134/152, 134/153, 134/170
[51] Int. Cl............................................... A47l 5/38
[58] Field of Search ............... 134/86, 88, 89, 102, 134/152, 153, 170; 15/302, 310, 304

[56] References Cited
UNITED STATES PATENTS

| | | | |
|---|---|---|---|
| 2,178,701 | 11/1939 | Petre | 134/33 |
| 3,442,273 | 5/1969 | Hanish et al. | 134/100 |
| 3,004,276 | 10/1961 | Hoffman | 15/310 X |
| 3,538,926 | 11/1970 | Nesbitt | 15/304 X |
| 3,121,437 | 2/1964 | Tomchak | 134/86 X |
| 3,650,283 | 3/1972 | Lang | 134/152 X |

Primary Examiner—John Petrakes
Assistant Examiner—C. K. Moore
Attorney—Jerry J. Dunlap et al.

[57] ABSTRACT

An improved apparatus for cleaning filter elements or the like wherein an external spray assembly and an internal spray assembly are adjustably supported to direct cleaning fluid onto the external and the internal peripheral surfaces of the filter elements being cleaned, and wherein the filter elements are adjustably supported in a cleaning position by a drive roller assembly and a bias roller assembly, each cooperating to position the filter element in predetermined cleaning positions during a cleaning cycle. The apparatus includes a drying assembly supporting the filter element in a drying position wherein the cleaning fluid is removed from the filter element via a vacuum produced in a drying chamber, during a drying cycle. The drying cycle and the cleaning cycle are each automatically controlled.

8 Claims, 4 Drawing Figures

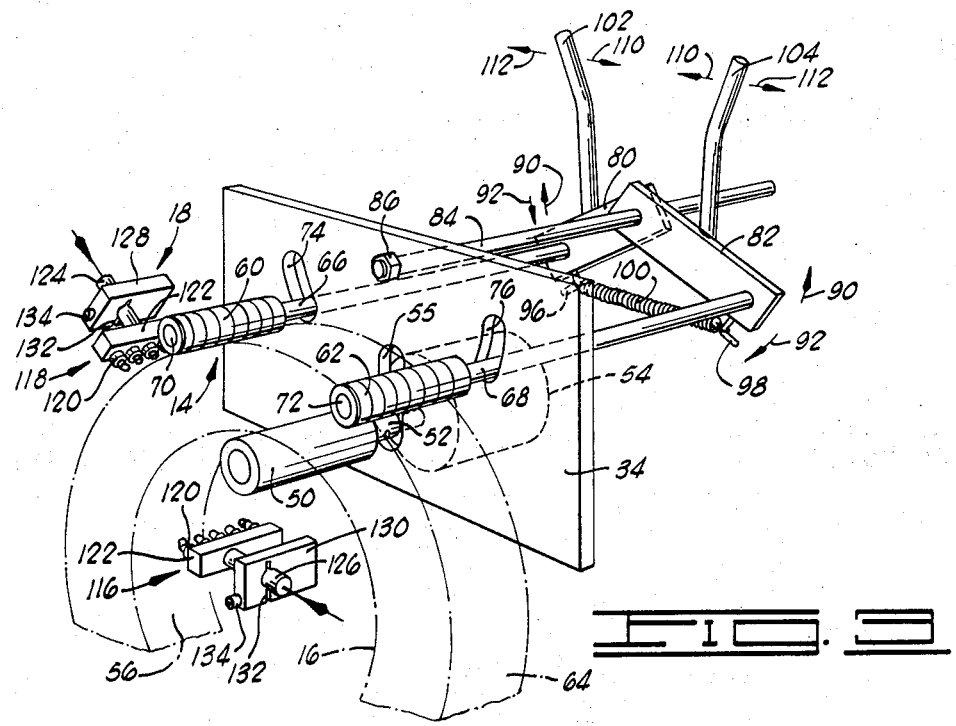
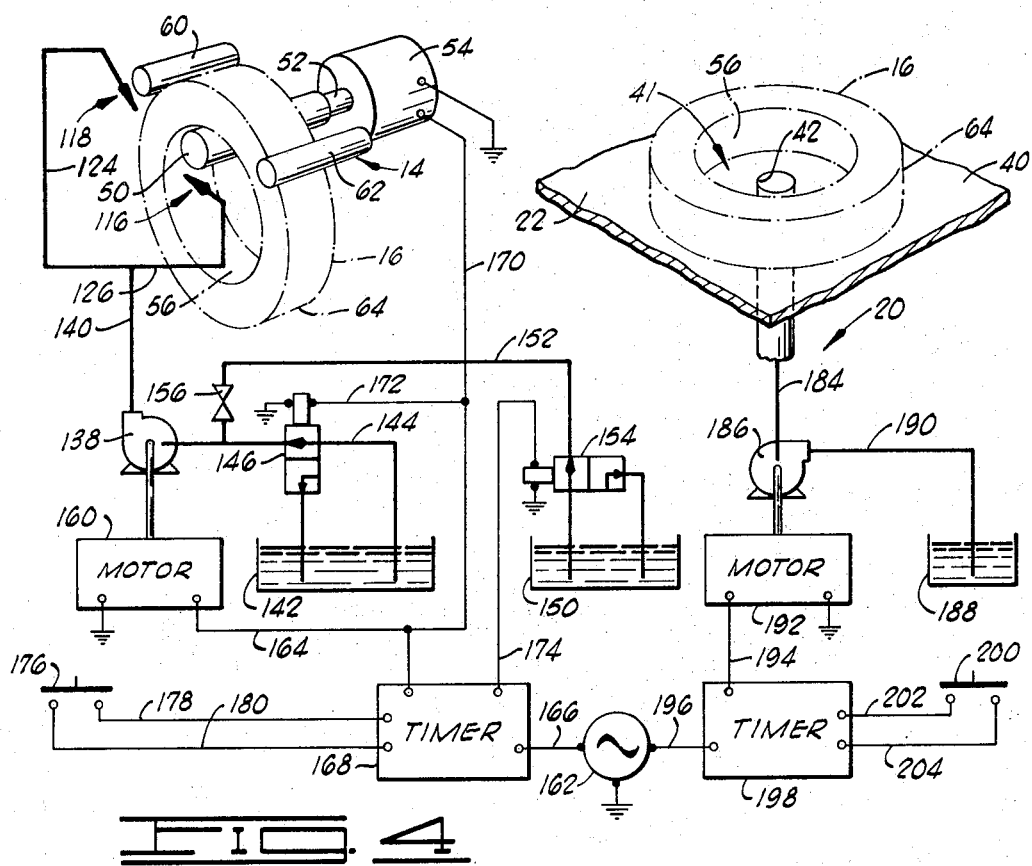

APPARATUS FOR CLEANING FILTER ELEMENTS OR THE LIKE

BACKGROUND OF THE INVENTION

1. Field of the Invention

This invention relates generally to improvements in cleaning apparatus and, more particularly, but not by way of limitation, to an automatic cleaning apparatus for filter elements or the like.

2. Brief Description of the Prior Art

In the past, various types of cleaning devices have been developed for cleaning filter elements, such as filter elements of the type utilized as in automobile air cleaner systems, for example. One such device was described in U.S. Pat. No. 3,442,273, and included an external sparge pipe and an internal sparge pipe, each arranged to spray a cleaning fluid onto predetermined portions of the filter elements. The filter element was supported on a pair of parallel positioned support rollers, at least one of the support rollers being driven to move the supported filter element. The cleaning sequence or cycle was operator-controlled via a number of control valves.

A similar type filter cleaner was described in U.S. Pat. No. 3,526,237, wherein the filter element was supported between a pair of plates and sprayed with a jet of cleansing liquid, the filter element being then dried via a heated air source. One other such cleaner was disclosed in U.S. Pat. No. 3,216,429, wherein the filter element was cleaned via a rotating spray nozzle assembly and subsequently dried via air pressure.

Various other filter element cleaners have included expansible members which were insertable within the inner periphery of the filter element and expanded therein into engagement with the filter element rotating the filter element, some others have utilized centrifugal force for drying the filter element, and some have been proposed utilizing a movable vacuum source to pull the cleaning fluid through the filter element during the cleaning cycle. Typical examples of such prior art filter element cleaners are disclosed in U.S. Pat. Nos. 3,089,167; 2,699,793; 2,178,701; 2,716,990; 1,691,514; 3,345,805; 2,615,456; 3,056,698; 3,174,490; and 2,919,704; and typical examples of strainer element cleaners are disclosed in U.S. Pat. Nos. 2,756,455; 2,170,081; and 2,170,082.

SUMMARY OF THE INVENTION

An object of the invention is to provide an apparatus for cleaning filter elements having a faster, more efficient and more economical drying apparatus.

Another object of the invention is to provide an apparatus for cleaning filter elements having a more positive, more efficient drive means for moving the filter element to predetermined cleaning positions during the cleaning cycle.

A further object of the invention is to provide an apparatus for cleaning filter elements having an improved filter element support assembly which is easily, quickly, and efficiently adaptable for supporting filter elements of various sizes, and for positively supporting the filter elements during the operation thereof.

One another object of the invention is to provide an apparatus for cleaning filter elements having an automatically controlled cleaning and drying cycle.

A further object of the invention is to provide an apparatus for cleaning filter elements which is compact and portable for easy, quick, and efficient transportation to various locations.

One additional object of the invention is to provide an apparatus for cleaning filter elements which is more efficient and more economical in construction and operation.

Other objects and advantages of the invention will be evident from the following detailed description when read in conjunction with the accompanying drawings which illustrate one embodiment of the invention.

BRIEF DESCRIPTION OF THE DRAWINGS

FIG. 3 is an enlarged, partial diagrammatical view of the filter element support assembly and the internal and external spray nozzle assemblies of the filter element cleaner of FIG. 1.

FIG. 4 is a partial diagrammatical, partial schematic view of the filter element cleaning assembly, the filter element drying assembly and the various control elements of the filter element cleaner of FIG. 1.

DESCRIPTION OF THE PREFERRED EMBODIMENT

Figure 1:
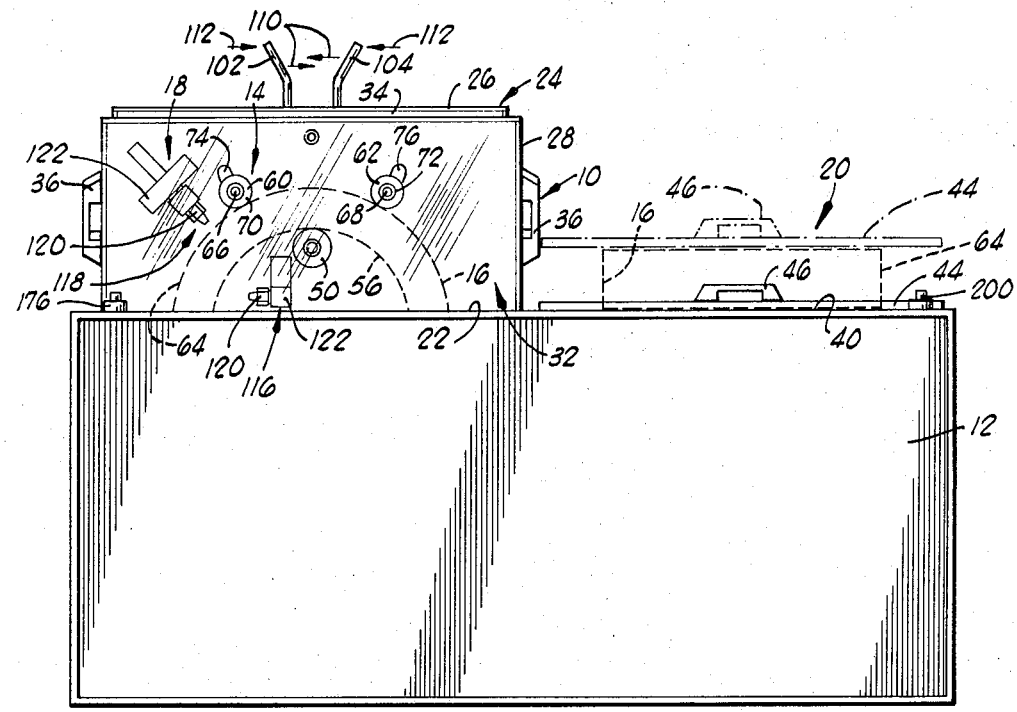
FIG. 1 is a front elevational view of the filter element cleaner of the present invention.

Referring to the drawings in general, and to FIGS. 1 and 2 in particular, shown therein and designated by the general reference numeral 10 is an automatic cleaner for air filter elements or the like, sometimes referred to below simply as the cleaner 10, which includes: a cabinet 12 supporting the various assemblies and components of the cleaner 10; a filter element support assembly 14 supported by the cabinet 12 for supporting a filter element in predetermined cleaning positions, the filter element being shown in dashed lines in FIGS. 1, 3 and 4 and designated therein by the reference numeral 16; a spray assembly 18 supported by the cabinet 12 for spraying cleaning fluid forced therethrough onot predetermined portions of the filter element 16, during the cleaning cycle of the cleaner 10; a drying assembly 20 supported by the cabinet 12 for supporting filter element 16 in a drying position and removing cleaning fluid therefrom, during the drying cycle of the cleaner 10; and a control assembly for controlling the cleaning cycle and the drying cycle of the cleaner 10, in a manner which will be made more apparent below. The cleaner 10 is, more particularly, constructed to clean and dry filter elements such as the filter elements commonly utilized in air cleaners of automobiles to filter the intake air for the internal combustion engine, for example. The filter elements vary somewhat with respect to the size and shape thereof; however, the filter elements are generally annularly shaped, ring-like members having a central opening therethrough, and generally comprise a pair of ring-like members constructed of a relatively rigid material and a filter element constructed of a material which is permeable to air and traps or otherwise prevents the foreign material and debris contained in the air from travelling therethrough, in a manner well known in the art.

As shown more clearly in FIG. 1, the filter element support assembly 14 and the filter element spray assembly 18 are each supported generally above an upper surface 22 of the cabinet 12, each assembly being partially disposed within and partially encompassed by a rectangularly shaped enclosure 24, The enclosure 24 includes a rear enclosure member 26 and a front enclosure member 28 hingedly connected thereto along the adjoining surfaces 30 so that the front enclosure member 28 can be opened and closed generally about the hinged connection, the front enclosure member 28 being constructed of a transparent material, in one form, as shown more clearly in FIG. 1.

Figure 2:
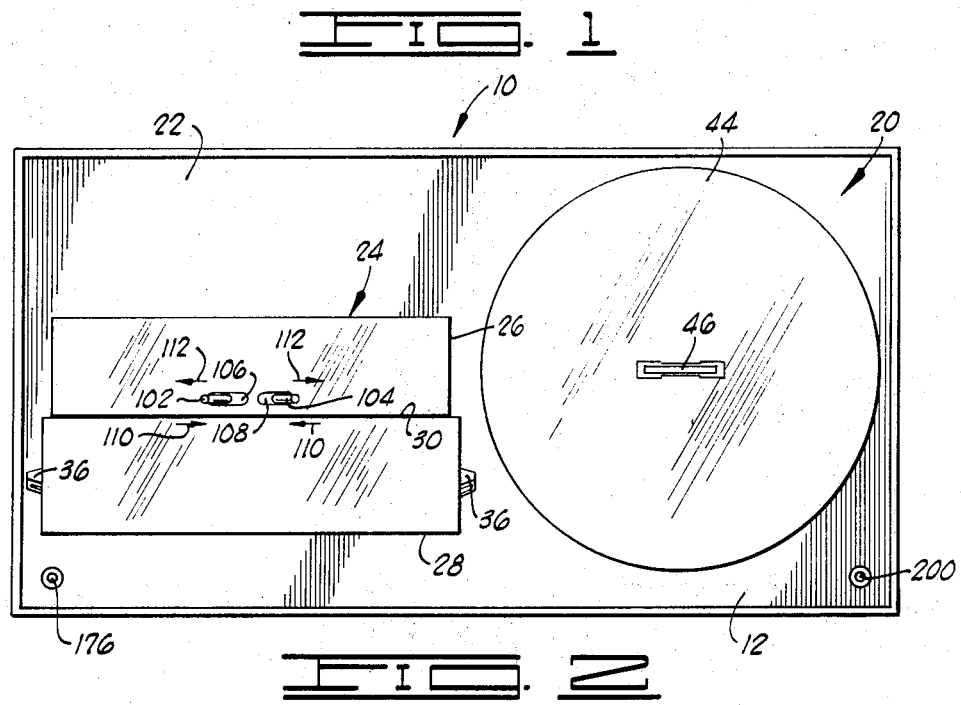
FIG. 2 is a top elevational view of the filter element cleaner of FIG. 1.

In the closed position of the front enclosure member 28, as shown in FIGS. 1 and 2, the rear enclosure member 26 and the front enclosure member 28 each cooperate with a portion of the cabinet 12 to form a cleaning chamber 32. The lower portion of the cleaning chamber 32 (not shown) extends a distance generally below the upper surface 22 of the cabinet 12 and is constructed to cooperate with the enclosure 24 to encompass the filter element 16 being cleaned and to provide space for the various components and fluid conduits. The rear enclosure member 26 and the front enclosure member 28 are separated via a wall 34, and a pair of handles 36 are secured to the front enclosure member 28 to facilitate the opening and the closing thereof.

As shown in FIGS. 1 and 4, a portion of the upper surface 22 of the cabinet 12 forms a support surface 40 for supporting the filter element 16 in a drying position, during the drying cycle of the cleaner 10. An aperture 42 is formed through the support surface 40, the aperture 42 being positioned on the support surface 40 such that the inner peripheral surface of the filter element 16 generally encompasses the aperture 42, in a drying position of the filter element 16.

The drying assembly 20 also includes cover 44 having a handle 46 secured to a central portion thereof. The cover 44 is, in one form, circularly shaped and constructed to engage and encompass a top portion of the filter element 16, in a drying position of the filter element 16, the cover 44 being supported generally above the support surface 40 by the filter element 16 and cooperating therewith to form a drying chamber 41 which is partially encompassed by the inner peripheral surface of the filter element 16, as will be described in greater detail below.

The filter element support assembly 14, as shown more clearly in FIGS. 3 and 4, includes a drive roller 50 which is secured on one end thereof to an output shaft 52 of an electric motor 54. As shown more clearly in FIG. 3, the motor 54 and the drive roller 50 are supported on opposite sides of the wall 34, and the interconnection therebetween extends generally through an elongated slot 55 formed in the wall 34. The drive roller 50 is, in one form, constructed of an elastomeric material or the like for engaging a portion of an inner peripheral surface 56 of the filter element 16, as shown more clearly in FIGS. 3 and 4, and drivingly moving the filter element 16 to predetermined cleaning positions in a driven position of the motor 54.

The filter support assembly 14 also includes a pair of biased rollers 60 and 62, the outer surface of each bias roller 60 and 62 being constructed to an elastomeric material, in a preferred form, for rolling and biasingly engaging a portion of an outer peripheral surface 64 of the filter element 16. The bias roller 60 is rollingly supported on one end of the roller shaft 66 and secured in an assembled position thereon via a retainer 70, and the bias roller 62 is rollingly supported on one end of the roller shaft 68 and secured in an assembled position thereon via a retainer 72, as shown more clearly in FIG. 3.

The roller shaft 66 extends through an elongated, arcuately shaped opening 74 formed through a portion of the wall 34, and the roller shaft 68 extends through an elongated, arcuately shaped opening 76 formed in the wall 34. The openings 74 and 76 in the wall 34 are substantially coplanar, in a horizontal plane, and each opening 74 and 76 is shaped to movably receive one of the roller shafts 66 and 68 and to provide a guide path for moving the bias rollers 60 and 62 to an engaged and a disengaged position with respect to the outer peripheral surface 64 of a filter element 16, during the operation of the cleaner 10, for reasons and in a manner which will be made more apparent below.

The end of the roller shaft 66, opposite the end thereof having the bias roller 60 supported thereon, is secured to one end of a rectangularly shaped pivot bar 80, and the end of the roller shaft 68, opposite the end thereof having the bias roller 62 secured thereon, is secured to one end of a rectangularly shaped pivot bar 82. The end of the pivot bar 80, opposite the end thereof secured to the roller shaft 66, is pivotally connected to the end of the pivot bar 82, opposite the end thereof connected to the roller shaft 68, via a pivot shaft 84. More particularly, one end portion of the pivot shaft 84 journally extends through an opening formed in each of the pivot bars 80 and 82, and the end of the pivot shaft 84, opposite the end thereof extending through the pivot bars 80 and 82, is secured to the wall 34 via a fastener 86. The pivot bars 80 and 82 are thus rotatable in a bias open position 90 and a bias close position 92, thereby moving the bias rollers 60 and 62 in a bias open direction 90 and a bias close direction 82, for reasons which will be made more apparent below.

A hook 96 is secured to the pivot bar 80, and a hook 98 is secured to the pivot bar 82. A bias spring 100 extends between the pivot bars 80 and 82, one end of the bias spring 100 being secured about the hook 96 and the opposite end of the bias spring 100 being secured about the hook 98. The bias spring 100 is thus positioned to bias the pivot bars 80 and 82 in a bias close direction 92, for reasons which will be made nore apparent below.

A rod shaped lever 102 is secured to an upper side of the pivot bar 80 and a rod shaped lever 104 is secured to an upper side of the pivot bar 82. The levers 102 and 104 each extend a distance in a generally upwardly direction, the lever 102 extending through an elongated opening 106 formed through the uuper surface of the rear enclosure member 26 and the lever 104 extending through an elongated opening 108 formed through the upper surface of the rear enclosure member 26. The levers 102 and 104 are thus movably disposed through the openings 106 and 108 such that the levers 102 and 104 can each be moved in a direction 110 and in a direction 112, thereby moving the pivot bars 80 and 82 in a bias open direction 90 and a bias close direction 92, for reasons which will be made more apparent below.

The spray assembly 18 includes an internal spray nozzle assembly 116 and an external spray nozzle assembly 118, the internal and the external spray nozzle assemblies 116 and 118 each being secured to and supported by the wall 34, as shown more clearly in FIG. 1. The internal spray nozzle assembly 16 is disposed with respect to the filter element 16 being cleaned such that the cleaning fluid pumped therethrough is directed toward and impinges upon the inner peripheral surface 56 of the filter element 16, and the external spray nozzle assembly 118 is disposed with respect to the filter element 16 to be cleaned such that the cleaning fluid pump therethrough is directed toward and impinges upon the outer peripheral surface 64 of the filter element 16 being cleaned.

The internal and the external spray nozzle assemblies 116 and 118 each include a plurality of nozzles 120 secured in a nozzle support 122. A fluid conduit 124 is secured to a portion of the nozzle support 122 of the external spray nozzle assembly 118, and a fluid conduit 126 is secured to a portion of the nozzle support 122 of the external spray nozzle assembly 118. The fluid conduit 124 extends through an opening formed through an adjustable support 128, and the fluid conduit 126 extends through an opening formed through an adjustable support 130, the adjustable supports 128 and 130 each being connected to the wall 134.

A slot 132 is formed through a portion of each adjustable support 128 and 130, each slot intersecting the aperture formed through one of the adjustable supports 128 and 130. A set screw 134 extends through each adjustable support 128, each set screw 134 engaging one of the conduits 124 and 126 to secure the conduits 124 and 126 in an assembled position. The spray nozzles 120 of the internal spray nozzle assembly 116 are thus supported via the adjustable support 130 such that the spray nozzles 120 thereof can be moved generally toward the inner peripheral surface 56 of the filter element 16 and generally away from the inner peripheral surface 56 of the filter element 16, thereby adjustably controlling the distance through which the fluid from the spray nozzles 120 must travel prior to impinging the inner peripheral surface 56 of the filter element 16. In a like manner the nozzles 120 of the external spray nozzle assembly 118 are also adjustably supported within the adjustable support 128 such that the nozzles 120 thereof are movable generally toward the outer peripheral surface 64 of the filter element 16 and generally away from the outer peripheral surface 64 of the filter element 16, thereby adjustably controlling the distance through which the fluid from the spray nozzles 120 of the external spray nozzle assembly 118 will travel prior to impinging the outer peripheral surface 64 of the filter element 16.

As shown more clearly in FIG. 4, the fluid conduits 124 and 126 are connected in parallel, each conduit 124 and 126 being connected to the discharge side of a pump 138 via a common conduit 140. The inlet side of the pump 138 is connected to a first fluid reservoir 142, which, in one form, may constitute a water supply source rather than a tank or the like physically located in the cleaner 10, via a conduit 144. A first control valve 146 is interposed in the conduit 144, generally between the first fluid reservoir 142 and the pump 138, the first control valve 146 being, in a preferred form, a solenoid operated control valve having a de-energized position interrupting fluidic communication between the first fluid reservoir 142 and the pump 138 and an energized position establishing fluidic communication between the first fluid reservoir 142 and the suction side of the pump 138. In one form, the first fluid reservoir 142 contains a rinse-type of fluid such as water.

The suction side of the pump 138 is also connected to a second fluid reservoir 150 via a conduit 152, the conduit 152 being connected to the conduit 144, as shown in FIG. 4. A second control valve 154 is interposed between the second fluid reservoir 150 and the suction side of the pump 138, the second control valve 154 being, in a preferred form, a solenoid operated type of control valve having an energized position establishing fluidic communication between the second fluid reservoir 150 and the suction side of the pump 138 and a de-energized position interrupting fluidic communication between the second fluid reservoir 150 and the suction side of the pump 138. A hand-operated valve 156 is interposed in the conduit 152, generally between the pump 138 and the second fluid reservoir 150. In one form, the second fluid reservoir 150 contains a concentrated detergent type solution which, during one aspect of the operation of the cleaner 10, is mixed with the fluid from the first fluid reservoir 142, the mixed solution being then pumped through the internal and the external spray nozzle assemblies 116 and 118.

In one form, as shown in FIG. 4, the pump 138 is driven via a motor 160, the motor 160 being connected to an electrical power source 162 via a pair of conductors 164 and 166. A timer network 168 is electrically interposed between the power source 162 and the motor 160. The motor 54, drivingly connected to the drive roller 50, is electrically connected to the power source 162 via a conductor 170 and the conductor 166, the conductor 170 being connected to the conductor 164. A conductor 172 connects the first control valve 146 to the power source 162 via the conductors 170, 164 and 166, the timer network 168 being interposed therebetween. A conductor 174 connects the second control valve 154 to the timer network 168, the second control valve 154 being connected to the power source 162 via the conductors 174 and 166 and the timer network 168 being interposed therebetween.

The timer network 168 is constructed to establish and interrupt electrical continuity between the power source 162, and the motors 160 and 54 and the first and the second control valves 146 and 154 in an automatically controlled sequence during the cleaning cycle of the cleaner 10, in an actuated position of the timer network 168. A momentary-contact type of push-button 176 is connected to the timer network 168 via a pair of conductors 178 and 180, the timer network 168 being activated by depressing the push-button 176 to establish momentary electrical continuity between the conductors 178 and 180.

In a preferred form, the timer network 168 is constructed to initially establish electrical continuity between the power source 162 and the motors 160 and 54 and the first control valve 146, thereby starting the motors 160 and 54 and energizing the first control valve 146, when the timer network 168 is activated by depressing the push-button 176. In this position of the timer network 168, fluid from the first fluid reservoir 142 will be pumped therefrom via the pump 138 and discharged through the spray assembly 18.

After a relatively short delay period of time, the timer network 168 will automatically establish electrical continuity between the power source 162 and the second control valve 154, thereby energizing the second control valve 154 and establishing fluidic communication between the second fluid reservoir 150 and the spray assembly 18. In this position of the timer network 168, fluid from the second fluid reservoir 150 will be pumped therefrom via the pump 138, mixed with the fluid being pumped from the first fluid reservoir 142, and the mixture being then discharged through the spray assembly 18.

The mixture of the fluid contained in the first and the second fluid reservoirs 142 and 150 is sprayed onto the filter element 16 being cleaned, while the drive roller 50 drivingly rotates the filter element 16 to predetermined cleaning positions to assure that the entire filter element 16 is subjected to the cleaning fluid and cleaned thereby during the cleaning cycle, for a predetermined period of time automatically controlled via the timer network 168.

In one form, the timer network 168 is constructed to interrupt electrical continuity between the power source 162 and the second control valve 154 after a predetermined period of time, thereby de-energizing the second control valve 154. In this position of the timer network 168, the fluid from the first fluid reservoir 142 will continue to be pumped therefrom via the pump 138 and discharged onto the filter element 16 through the spray assembly 18, thereby rinsing the filter element 16 to remove substantially all of the fluid subsequently sprayed thereon from the second fluid reservoir 150.

After a predetermined period of time, the timer network 168 will be automatically deactivated, thereby deenergizing the first control valve 146 and stopping the motors 160 and 54. In the deactivated position of the timer network 168, the cleaning cycle of the cleaner 10 is thus terminated.

The percent weight of volume of fluid from the second fluid reservoir 150 which is mixed with the fluid from the first fluid reservoir 142, during one aspect of the operation of the cleaner 10, is controlled via the relative sizes of the conduits 144 and 152 and the control valve 156, the control valve 156 being opened and closed to varying degrees to adjust the mixture. In one form, the control valve 156 can be completely closed so that only the fluid retained in the first fluid reservoir 142 is utilized during the cleaning cycle of the cleaner 10, regardless of the position of the second control valve 154.

It should be particularly noted that the first control valve 146, the second control valve 154 and the motors 160 and 54 are each connected to the timer network 168 such that the cleaning cycle can be easily and quickly adapted for various filter element cleaning applications. For example, the first and the second control valves 146 and 154 can be energized simultaneously, or de-energized simultaneously to provide various cleaning cycles utilizing the two fluid reservoirs 142 and 150 in an optimum manner for the particular filter element cleaning application. It should also be noted that, in some applications, it may be desirable to utilize the fluid retained in only one of the fluid reservoirs 142 and 150, and, in this instance, the timer network 168 is constructed to energize and de-energize only one of the control valves 146 and 154, depending upon which fluid reservoir 142 or 150 is to be utilized.

It should also be noted that the terms "rinse type fluid" and "detergent type fluid" are used above and below to generally denote that the first and the second fluid reservoirs 142 and 150 retain fluids having different chemical compositions and, in one form, a single fluid reservoir could be utilized having a pre-mixed solution of a detergent type of fluid and a rinse type of fluid. The term "cleaning fluid" is used above and below to denote the fluid discharged through the spray assembly 18 which, in one form, is the fluid retained in the first fluid reservoir and, in one other form, is the mixture of the fluids retained in the first and the second fluid reservoirs 142 and 150.

As shown more clearly in FIG. 4, the drying assembly 20 includes a conduit 184 connected on one end thereof to the suction side of a vacuum pump 186 and on the opposite end thereof to the support surface 40. More particularly, the conduit 184 is connected to the support surface 40 of the cabinet 12 such that the conduit 184 is in fluidic communication with the drying chamber 41 via the aperture 42 formed through the support surface 40. The discharge side of the vacuum pump 186 is connected to a third fluid reservoir 188 via a conduit 190.

It should be noted that, in one form, the reservoir 188 may constitute a drain connected to drain the fluid from the cleaner 10 rather than a tank or the like physically located in the cleaner 10. In this regard, it should also be noted that the cleaner 10 includes a drain disposed and connected to continuously drain (not shown) the fluid from the cleaning chamber 32 during the cleaning cycle, and, in one embodiment, this drain can be commonly connected with the drain for draining the fluid from the drying chamber 41.

The vacuum pump 186 is driven via a motor 192, the motor 192 being electrically connected to the power source 162 via a pair of conductors 194 and 196. A timer network 198 is interposed between the motor 192 and the power source 162, the timer network 198 being constructed to establish electrical continuity between the motor 192 and the power source 162, in an activated position thereof, for a predetermined period of time during the drying cycle of the cleaner 10, and to interrupt electrical continuity between the motor 192 and the power source 162, in a deactivated position thereof. A momentary-contact, push-button 200 is connected to the timer network 198 via a pair of conductors 202 and 204.

The timer network 198 is, more particularly, connected to interrupt electrical continuity between the motor 192 and the power source 162 until the pushbutton 200 is moved to a closed position, momentarily establishing electrical continuity between the conductors 202 and 204 and activating the timer network 198. In the activated position of the timer network 198, electrical continuity is automatically established between the motor 192 and the power source 162 via the timer network 198 for a predetermined period of time and, at the expiration of such predetermined period of time, the timer network 198 will automatically interrupt the electrical continuity between the motor 192 and the power source 162.

The timer 198 and the push-button 200 thus cooperate to control the drying cycle of the cleaner 10, in a manner similar to the timer network 168 and the push-button 176, described before. Timer networks constructed to operate in a manner similar to that described above with respect to the timer networks 168 and 198 are well known in the art, and a detailed description of the various componenets and the interconnections therebetween is not required herein.

In a particular filter cleaning application it has been found that the filter element can be thoroughly dried in a matter of a few seconds and, in this instance, the timer 198 can be eliminated and the push-button 200 merely depressed to establish momentary contact for the short duration of the drying cycle.

Operation

The cleaner 10 is constructed to support filter elements of varying sizes, and to drivingly rotate the filter elements to be cleaned to predetermined cleaning positions, during the cleaning cycle; and to remove substantially all of the cleaning fluid remaining in the cleaned filter element during the drying cycle of the cleaner 10 are each automatically controlled, and the cleaner 10 and the control elements associated therewith are each constructed for quick, efficient, easy and relatively maintenance free operation.

To initiate the operation of the cleaner 10, the front enclosure member 28 is rotated to an open position, generally about the hinged connection between the rear enclosure member 26 and the front enclosure member 28, wherein the front enclosure member 28 is extended in a generally vertically upwardly direction, thereby opening and providing access to the cleaning chamber 32. The levers 102 and 104 are then each moved in the direction 110 to pivotally move the pivot bars 80 and 82 in the bias open direction 90, thereby moving the bias rollers 60 and 62 in a generally arcuately shaped path defined by the first and the second openings 74 and 76 through the wall 32 or, in other words, moving the bias rollers 60 and 62 in a generally bias open direction 90. The movement of the bias rollers 60 and 62 in a bias open direction 90 increases the distance between the drive roller 50 and each of the bias rollers 60 and 62, thereby positioning the filter element support assembly 14 for receiving the filter elements to be cleaned.

The filter element 16 to be cleaned is inserted into the cleaning chamber 32 to a position wherein the inner peripheral surface 56 thereof engages a portion of the drive roller 50 and is generally supported thereon, as shown in FIGS. 1, 3 and 4. The levers 102 and 104 are then released, and the bias spring 100 biasingly pivots each pivot bar 80 and 82 in a bias close direction 92 about the pivot axis formed by the pivot shaft 84, thereby moving the bias rollers 60 and 62 in a bias close direction 92 to a position wherein each bias roller 60 and 62 engages a portion of the outer peripheral surface 64 of the filter element 16 to be cleaned. The bias spring 100 thus biasingly maintains the rolling engagement between each bias roller 60 and 62 and the outer peripheral surface 64 of the filter element 16 and biases each bias roller 60 and 62 in a direction biasing the filter element 16 generally toward the drive roller 50 to maintain the driving engagement between the drive roller 50 and the filter element 16 during the operation of the cleaner 10. It will also be apparent from the foregoing that, since the bias rollers 60 and 62 are movably supported such that the distance between the bias rollers 60 and 62 and the drive roller 50 is adjustable, filter elements of varying sizes, that is filter elements having varying distances generally between the inner peripheral surface and the outer peripheral surface thereof, can be quickly, easily and efficiently supported in a cleaning position and maintained in driving engagement with the drive roller 50 of the cleaner 10 via the filter element support asssmbly 14.

After the filter element 16 has been inserted into the cleaning chamber 32 and securely supported in a cleaning position therein, the push-button 176 is depressed to establish electrical continuity between the conductors 178 and 180, thereby activating the timer network 168 and initiating the cleaning cycle of the cleaner 10. In this position of the cleaner 10, the pump 138 is driven by the motor 160, the first control valve 146 is energized and the drive roller 50 is rotatingly driven by the motor 54, the second control valve 154 still being in a de-energized position at this time, in a preferred form. In the driven position of the pump 138, the fluid retained in the first fluid reservoir 142 is pumped therefrom through the conduits 144, 140, 124 and 126, and discharged through the spray nozzles 120 of the internal spray nozzle assembly 116 and the external spray nozzle assembly 118 onto the inner and the outer peripheral surfaces 56 and 64 of the filter element 16, in a manner described before.

After a predetermined period of time, the second control valve 154 is energized via the timer network 168, thereby establishing fluidic communication between the second fluid reservoir 150 and the suction side of the pump 138. The fluid from the second fluid reservoir 150 is then mixed with the fluid from the first fluid reservoir 142, generally at the connection between the conduit 152 and 144, the mixed solution of cleaning fluid being pumped through and discharged from the spray assembly 18.

In one operational embodiment, as mentioned before, the timer network 168 will automatically interrupt electrical continuity between the second control valve 154 and the power source 162, after a predetermined period of time, thereby de-energizing the second control valve 154. In this position of the cleaner 10, the fluid from the first fluid reservoir 142 will be pumped through and discharged from the spray assembly 18 to rinse the filter element 16. After the completion of the rinse cycle, the timer network 168 will automatically interrupt the electrical continuity between the motors 160 and 54, the first control valve 146 and the power source 162, thereby terminating the cleaning cycle of the cleaner 10.

After the termination of the cleaning cycle of the cleaner 10, the front enclosure member 28 is again raised to an open position, and the levers 102 and 104 are moved in a direction 110 to disengage the bias rollers 60 and 62 from the filter element 16, in a manner simular to that described before. In the disengaged position of the filter element support assembly 14, the filter element 16 is removed therefrom, and the cleaner 10 is once again in a position to supportingly receive and automatically clean another filter element.

The cover 44 is then removed from the support surface 40 formed by a portion of the upper surface 22 of the cabinet 12, and the cleaned filter element 16 is disposed in a drying position on the support surface 40 wherein the inner peripheral surface 56 of the filter element 16 surrounds the aperture 42 in the support surface 40. The cover 44 is then disposed generally on top of the filter element 16 (as shown in dashed lines in FIG. 1), the filter element 16 thus being supported in a drying position generally between the cover 44 and the support surface 40. The diameter of the cover 44 is sufficiently large to substantially cover and enclose the opening through the filter element 16 formed by the inner peripheral surface 56 thereof, the cover 44 thus engaging the filter element 16 and being supported thereby generally above the support surface 40 in a position wherein the cover 44 and the support surface 40 cooperate to form the drying chamber 41 which is enclosed by inner peripheral surface 56 of the filter element 16.

The drying cycle is then initiated by depressing the push-button 200 to establish electrical continuity between the conductors 202 and 204, thereby activating the timer network 198. In the activated position of the timer network 198, electrical continuity is established between the conductors 194 and 196 to start the motor 192, thereby driving the vacuum pump 186. In the driven position of the vacuum pump 186, a vacuum is established generally within the drying chamber 41 to remove the cleaning fluid from the filter element 16, the cleaning fluid thus removed during the drying cycle being discharged into the third fluid reservoir 188. After a predetermined period of time, the timer network 198 is automatically deactivated, thereby stopping the motor 192 and terminating the drying cycle of the cleaner 10.

The automatic cleaner 10 for air filter elements or the like, described in detail above, is thus constructed to securely support filter elements of varying sizes in a cleaning position and to biasingly maintain a driving engagement between the filter element being cleaned and the drive roller so that the filter element can be easily and positively driven to predetermined cleaning positions, thereby assuring that the entire filter element is cleaned during the cleaning cycle. The control elements and the apparatus associated with the cleaning cycle of the cleaner 10 are also constructed and arranged in such a manner that the filter element can be cleaned utilizing only a rinse-type fluid; such that the filter element can be cleaned utilizing a rinse-type fluid mixed with a detergent-type fluid; and such that the filter element can be cleaned utilizing a rinse-type fluid mixed with a detergent-type fluid and the cleaning fluid subsequently rinsed from the cleaned filter element by the rinse-type fluid. In summary, the various components and apparatus associated with the cleaning cycle of the cleaner 10 are arranged to that the filter element 16 can be cleaned utilizing a rinse-type fluid and a detergent-type fluid, each fluid being applied to the filter element 16 at predetermined times and in a predetermined control cycle. The drying assembly 20 of the cleaner 10 is constructed to remove the cleaning fluid from the cleaned filter element in a fast, quick, efficient and relatively maintenance free manner utilizing a vacuum-type suction source applied generally within the area encompassed by the inner peripheral surface of the filter element being dried.

The various assemblies and control components of the cleaner 10 are all supported by the cabinet 12 in a compact manner such that the cleaner 10 can be quickly and easily transported to various locations, thereby providing a compact and essentially portable cleaning assembly. It should also be noted that the various components and control apparatus of the cleaner 10 are constructed such that the cleaner 10 can be easily and quickly adapted for coin-operation by simply adding a coin receiver constructed to maintain electrical discontinuity between the power source 162 and the timer networks 168 and 198 until the proper amount of change has been deposited therein, for example.

Changes may be made in the construction and the arrangement of the various parts or the elements of the embodiment of the invention as disclosed herein without departing from the spirit and scope of the invention as defined in the following claims.

What is claimed is:

1. Apparatus for cleaning filter elements having an inner peripheral surface and an outer peripheral surface, comprising:
   a cabinet means;
   filter element support means supported by the cabinet means engageable with a portion of the filter element for supporting the filter element in predetermined cleaning positions during the cleaning cycle, comprising:
     a drive roller rotatingly supported in the cabinet means, the drive roller engageable with a portion of the inner peripheral surface of the filter element rotatingly moving the filter element to predetermined cleaning positions in a rotating position of the drive roller;
     means rotatingly driving the drive roller; and
     bias roller means rotatingly supported in the cabinet means, the bias roller means rollingly engageable with a portion of the outer peripheral surface of the filter element biasing the filter element generally toward the drive roller for maintaining the driving engagemeent between the filter element and the drive roller;
   means supported by the cabinet means spraying cleaning fluid onto predetermined portions of the filter element during the cleaning cycle;
   a support surface connected to a portion of the cabinet means having an aperture formed therethrough, the support surface engageable with the filter element for supporting the filter element in a drying position during the drying cycle, the inner peripheral surface of the filter element encompassing the aperture in the support surface in a drying position of the filter element;
   a cover engageable with a portion of the filter element, the cover being supportable via the filter element above the support surface for forming the drying chamber; and
   vacuum means supported by the cabinet means having a portion in communication with the drying chamber and providing a vacuum in a portion of the drying chamber removing cleaning fluid from the filter element during the drying cycle.

2. The apparatus of claim 1 wherein the filter element support means is defined further to include:
   a wall secured to a portion of the cabinet means having a pair of arcuately shaped apertures formed therethrough, each aperture lying in a substantially coplanar horizontal plane;
   a pair of roller shafts, each roller shaft having one end portion thereof movably extending through one of the apertures formed in the wall, each one of the bias rollers being rollingly supported on one end of one of the roller shafts;
   a pair of pivot bars, one end of each pivot bar secured to the end of one of the roller shafts, generally opposite the end of the roller shafts rollingly supporting the bias rollers;

a pivot shaft having one end portion secured to the wall and the opposite end portion pivotally extending through the end of each pivot bar, generally opposite the end of each pivot bar connected to one of the roller shafts providing a common pivot axis for the pivot bars, the pivot bars being pivotable in a bias open direction and in a bias close direction to move the roller shafts in the apertures of the wall thereby moving the bias rollers in a bias open direction generally away from the filter element and in a bias close direction generally toward engagement with the filter element; and means to pivotally move the pivot bars in a bias open direction and in a bias close direction.

3. The apparatus of claim 2 wherein the means to move the pivot bars is defined further to include:

a pair of levers, one end of each lever secured to a portion of one of the pivot bars, the levers movable in one direction to pivot the pivot bars in a bias open dirction and movable in one other direction to pivot the pivot bars in a bias close direction.

4. The apparatus of claim 3 wherin the means to move the pivot bars is defined further to include: a bias spring having one end connected to one of the pivot bars and the opposite end connected to the other pivot bar, the bias spring biasing the pivot bars in a bias close direction.

5. The apparatus of claim 1 wherein the means spraying cleaning fluid is defined further to include:

internal spray nozzle means supported by the cabinet means directing cleaning fluid onto the inner peripheral surface of the filter element; and external spray nozzle means supported by the cabinet means directing cleaning fluid onto the outer peripheral surface of the filter element.

6. The apparatus of claim 5 wherein the means spraying the cleaning fluid is defined further:

adjustable support means secured to a portion of the cabinet means adjustably connected to the external spray nozzle means and the internal spray nozzle means, the distance between the internal spray nozzle means and the inner peripheral surface of the filter element and the distance between the external spray nozzle means and the outer peripheral surface of the filter element each adjustable via the adjustable connection between the adjustable support means and the internal and the external spray nozzle means.

7. The apparatus of claim 1 defined further to include:

a first fluid reservoir retaining a rinse-type fluid connected to the means spraying cleaning fluid onto the filter element;

a second fluid reservoir retaining a detergent type fluid connected to the means spraying cleaning fluid onto the filter element;

pump means interposed between the first and the second fluid reservoir means and the means spraying cleaning fluid, the pump means pumping cleaning fluid from the first and the second fluid reservoirs through the means spraying cleaning fluid when in fluidic communication therewith and in a driven position of the pump means;

means to drive the pump means in an actuated position thereof;

first control valve means interposed between the first fluid reservoir and the pump means interrupting fluidic communication therebetween in one position thereof;

second control valve means interposed between the second fluid reservoir and the pump means interrupting fluidic communication therebetween in one position thereof; and control means connected to the first control valve means, the second control valve means, and the means to drive the pump means, the control means actuating the means to drive the pump means for a predetermined period of time during the cleaning cycle and positioning the first control valve means and the second control valve means to establish fluidic communication between the first fluid reservoir and the second fluid reservoir and the means spraying cleaning fluid for predetermined periods of time during the cleaning cycle, thereby controlling the cleaning cycle and the cleaning fluid sprayed onto the filter element.

8. The apparatus of claim 1 wherein the vacuum means is defined further to include:

vacuum pump means connected to the aperture in the support surface providing a vacuum in a portion of the drying chamber in a driven position thereof;

means to drive the vacuum pump means in an actuated position thereof; and control means connected to the means to drive the vacuum pump means actuating the vacuum pump means for a predetermined period of time during the drying cycle in one position of the control means.

* * * * *

UNITED STATES PATENT OFFICE

CERTIFICATE OF CORRECTION

Patent No. 3,765,051  Dated  October 16, 1973

Inventor(s) Charles T. Wanat

It is certified that error appears in the above-identified patent and that said Letters Patent are hereby corrected as shown below:

Column 2, line 41, "onot" should be --onto--.

Column 3, line 1, "," should be --.--.

Column 4, line 36, "direction 82" should be --direction 92--.

Column 4, line 52, "uuper" should be --upper--.

Column 10, line 52, "simular" should be --similar--.

Column 13, line 20, "dirction" should be --direction--.

Signed and sealed this 19th day of February 1974.

(SEAL)
Attest:

EDWARD M. FLETCHER, JR.
Attesting Officer

C. MARSHALL DANN
Commissioner of Patents